United States Patent [19]

Zeller et al.

[11] 4,006,805

[45] Feb. 8, 1977

[54] CLUTCHES WITH BYPASS INCHING VALVE

[75] Inventors: Burton S. Zeller; Ronald L. Sisson, both of Jackson, Mich.

[73] Assignee: Clark Equipment Company, Buchanan, Mich.

[22] Filed: June 30, 1975

[21] Appl. No.: 591,570

[52] U.S. Cl. .............................. 192/4 A; 192/13 R; 192/109 F; 192/113 B; 137/116
[51] Int. Cl.² ........................................ B60K 29/02
[58] Field of Search ................ 192/4 A, 4 C, 13 R, 192/87.18, 87.19, 109 F

[56] References Cited

UNITED STATES PATENTS

| | | | |
|---|---|---|---|
| 2,618,723 | 11/1971 | McPherson | 192/87.19 |
| 2,814,371 | 11/1957 | Bolster et al. | 192/13 R |
| 2,972,906 | 2/1961 | Schroeder | 192/13 R |
| 3,715,017 | 2/1973 | Jenney | 192/4 A |
| 3,727,737 | 4/1973 | Phinney | 192/109 F |

FOREIGN PATENTS OR APPLICATIONS

| | | | |
|---|---|---|---|
| 45-26534 | 8/1965 | Japan | 192/109 F |
| 1,221,119 | 2/1971 | United Kingdom | 192/109 F |

*Primary Examiner*—Benjamin W. Wyche
*Attorney, Agent, or Firm*—Ernst H. Ruf

[57] ABSTRACT

A transmission control apparatus for a vehicle having a transmission with fluid actuated clutch means and hydraulic brake means wherein a first fluid conduit, having a fluid flow constricting means interposed therein, connects a fluid pressure source with the clutch means, with an inching valve means being fluidically connected in parallel with the first conduit by second and third conduits upstream and downstream respectively, from the fluid flow constricting means, for regulating the pressure of the pressure fluid supplied to the clutch means, with the inching valve means also being operatively connected with the brake means and responsive to the degree of actuation of the brake means and actuatable between a first and a second position, whereby in the first position, the pressure fluid can freely flow into, through and out of the inching valve toward the clutch means so as to effectively bypass the fluid flow constricting means, however in the second position, the fluid flow through the second conduit is blocked off and the flow of fluid toward the clutch means is forced to flow solely through the fluid flow constricting means, thereby keeping the clutch means filled with fluid at all times. A further conduit connects the pressure fluid with the clutch means for lubrication and cooling purposes, with the fluid flow constricting means, in the second position, functioning to lower the fluid flow through the first conduit so as to increase the amount of fluid flow into the further fluid conduit.

10 Claims, 4 Drawing Figures

CLUTCHES WITH BYPASS INCHING VALVE

BACKGROUND OF THE INVENTION

1. Field of the Invention

The field of art to which this invention pertains includes pressure regulator valve means for use in fluid operated control systems. More particularly, the bypass type inching valve system of this invention is constructed to control and regulate fluid pressure and it may be disposed, for example, between a source of pressurized fluid and a device operated thereby such as a transmission clutch.

2. Description of the Prior Art

Briefly, this invention constitutes an improvement in pressure regulating or inching valve systems of the bypass type. Such control valve mechanisms are often used in the prior art for regulating pressure to a fluid operated clutch of the type often found in the constant-mesh power-shift transmissions of industrial vehicles, such as lift trucks, and other machines. Specifically, such prior art control valves are frequently constructed to permit an immediate relief of a portion of the clutch application pressure followed by a regulated decrease or increase in the fluid pressure applied to the fluid clutch whereby the latter may be gradually disengaged or engaged by the operator. One particular use of this type of regulating valve, contemplates the control of a fluid-pressure actuated clutch for the transmission of an industrial vehicle, such as a lift truck, where it is often necessary to hold a truck stationary while the lift fork is operated at a speed corresponding to full engine speed without shifting the transmission to the neutral position. It is desirable, in such circumstances, to be able to precisely move or "inch" the vehicle in either the forward or reverse direction in order to achieve accurate positioning in handling of materials.

Various controls and regulating valves for performing the above-stated function in conjunction with power-shift transmissions employing fluid pressure actuated transmission clutches have been disclosed previously as exemplified by U.S. Pat. No. 3,143,127, to Frost, issued 4 Aug. 1964. In order to carry out its regulating valve function, the valve means, such as described in the previously-identified patent, have been provided to affect improved gradual engagement and disengagement of the vehicle clutch and the relief of excess pressures in the system by operating such valve means in conjunction with the application and release of the vehicle brakes. In such structures, wherein the operation of the valve means may be either hydraulic or mechanical, when the brakes are actuated, the valve means shifts to a position partially interrupting fluid flow from a clutch control valve and affects controlled partial deactuation of a clutch means by maintaining a relatively low fluid pressure, thus providing control of the torque to the wheels of the vehicle.

There is an extensive body of prior art dealing with inching valves wherein the flow of pressurized fluid to the clutch undergoing inching is completely cut off during at least a portion of the inching cycle. The presence of a bypass arrangement, which keeps at least some fluid flowing to the clutch undergoing inching, insures a continuous supply of fluid to this clutch so that, at the termination of the inching function, there is no delay occasioned by the refilling of the clutch.

While prior art U.S. Pat. Nos. 2,814,371 to Bolster et al, and 2,972,906 to Schroeder, disclose inching valves that incorporate internal bypass arrangements, their structure and function are substantially different. While both the Bolster et al and Schroeder inching valves are responsive to engine speed and dependent on oil flow, the structure of this invention is a self-compensating pressure system and not dependent on oil flow.

SUMMARY OF THE INVENTION

The inching valve means of this invention is utilized in a control apparatus wherein a hydraulic passage means connects a fluid pressure source with the clutch means and fluid flow constricting means are disposed in this passage means intermediate the pressure source and the clutch. Basically, the inching valve means is fluidically connected in parallel with the hydraulic passage means by first and second conduits upstream and downstream respectively from the fluid flow constricting means, for regulating the fluid pressure supplied to the clutch means. The inching valve is operatively connected with a brake system and responsive to the degree of actuation of the brake pedal and is actuable between a first and a second position whereby in the first position the pressure fluid can freely flow into, through and out of the inching valve toward the clutch means so as to effectively bypass the fluid flow constricting means. However, in the second position, the fluid flow through the second conduit is blocked off and the flow of pressure fluid toward the clutch is forced to flow solely through the fluid flow constricting means thereby keeping the clutch filled with fluid at all times. After the fluid flow through the second conduit is blocked off, an outer end surface of a regulating spool member within the inching valve progressively opens up a drain port thereby lowering the fluid pressure within the inching valve until the pressure therein drops to a point where the force exerted on the regulating spool member by the pressure fluid within the valve cavity is in balance with the opposing force exerted by a regulating spring.

The bypass inching valve system includes a further conduit which is connected to the hydraulic passage means upstream from the second conduit and is adapted to deliver fluid to the clutch for lubricating and cooling purposes, with the fluid flow constricting means, in the second position of the inching valve, functioning to lower the fluid flow through hydraulic passage means in order to increase the amount of fluid flow into the further fluid conduit.

Keeping the clutch filled with fluid not only permits quicker clutch response but also minimizes the effect of possible fluid leakage from the clutch. In addition, rather than dumping excess fluid to the reservoir, during the inching operation, the fluid flow constricting means functions to lower the fluid flow and permits the surplus fluid to flow to the transmission lubrication circuit for lubricating and cooling purposes.

Other features and advantages of this improved bypass type inching valve system will be more readily understood by persons skilled in the art when following the detailed description in conjunction with the several drawings.

DESCRIPTION OF THE PREFERRED EMBODIMENT

Figure 2:
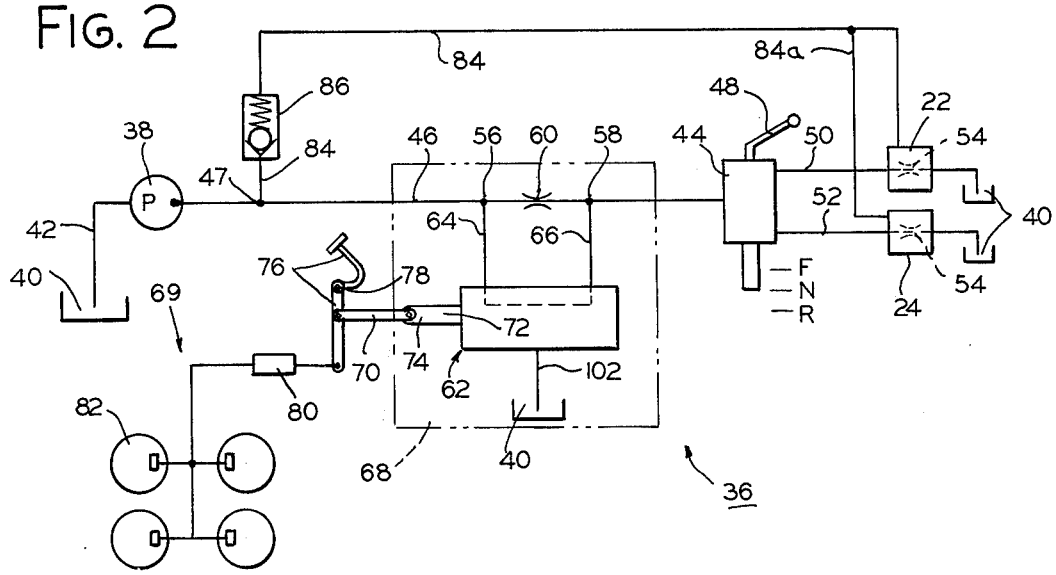
FIG. 2 is a schematic diagram of a typical fluid system in which the improved bypass type inching valve system of the present invention finds utility.
Figure 1:
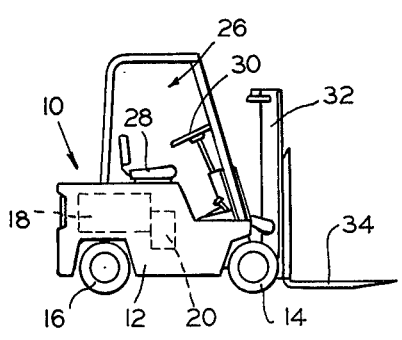
FIG. 1 shows an industrial vehicle, such as a lift truck, embodying the present invention.

Referring now to the drawings in detail, in FIG. 1, the reference numeral 10 denotes generally an industrial vehicle, such as a lift truck, having a body 12 supported by a pair of drive wheels 14 and a pair of dirigible wheels 16. An engine 18 is disposed in body 12 and is connected to drive wheels 14 through a power shift transmission 20 which includes a fluid pressure actuated forward clutch 22 (FIG. 2) and a fluid pressure actuated reverse clutch 24 (FIG. 2). Located on body 12 is an operator's station 26 which includes a seat 28, a steering wheel 30 and various hand as well as foot controls. Mounted on the front of lift truck 10 is a telescopic upright 32 which carries a pair of forwardly extending load engaging fork arms 34 adapted to be inserted into a pallet on which a load is placed.

Referring now to FIG. 2, the bypass type "inching" system will now be described. Numeral 36 generally denotes a typical fluid system or circuit in which the bypass type inching or regulator valve is utilized. Inching system 36 includes a pump 38, driven proportional to engine speed, which draws fluid from a reservoir 40 via a fluid conduit 42 and supplies pressurized fluid to a conventional directional control valve 44 via a supply conduit 46. It should be understood that while a plurality of reservoirs 40 are shown in the schematic representation of FIG. 1, in actual construction only a single reservoir 40 is utilized. Directional control valve 44 may be of the double-acting valve spool variety, an example of which is shown in U.S. Pat. No. 3,143,127. The positioning of directional control valve 44 is in response to actuation of a selector lever 48 available to the operator of the vehicle. The positioning of valve 44 serves to control the passage of pressurized fluid from supply conduit 46 to conduits 50 and 52 and thus serves to control the operation of forward and reverse transmission direction clutches 22 and 24. In this regard, it should be noted that directional control valve 44 has three positions of operation, neutral as shown in FIG. 2, or to either side of the neutral position to selectively admit pressurized fluid to either of the two directional control clutches or frictional engaging means 22 and 24. Each one of clutches 22 and 24 in turn includes internal orifice means 54 and is also connected to reservoir 40, with each orifice 54 permitting controlled flow of pressurized fluid from its associated clutch back to the reservoir.

Supply conduit 46 is provided with fluid flow constricting means, such as a supply orifice 60, and an inching or regulating valve 62 is connected, in parallel, upstream and downstream from supply orifice 60 by means of conduits 64 and 66 respectively. In the schematic representation of FIG. 1, inching valve 62 together with supply orifice 60 and their associated conduits is contained within the area defined by phantom line 68, with the structural details within this area, which comprise the bypass type inching valve system of this invention, being shown in FIG. 3.

Figure 3:
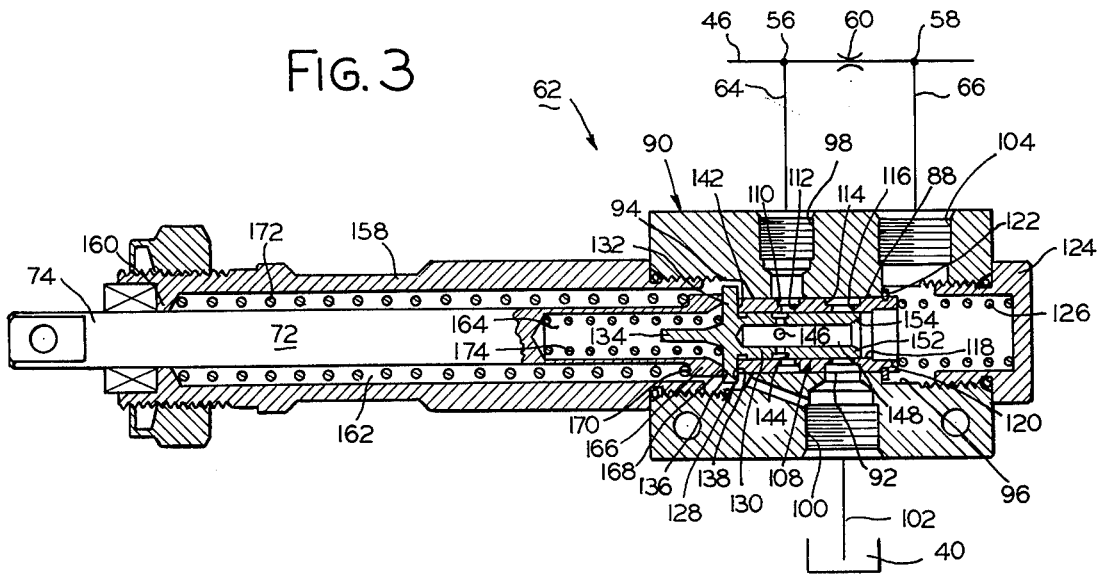
FIG. 3 is an enlarged fragmentary structural view of the bypass type inching valve system shown diagrammatically in FIG. 2.

Actuation of inching valve 62, which will be explained in more detail with reference to FIG. 3 later, is via the vehicle brake system, generally denoted by numeral 69. The method of actuation can either be hydraulic, such as for example via a servo-cylinder (not shown) attached to one end of inching valve 62 and operated by pressurized brake fluid, or via a mechanical linkage interconnecting valve 62 and brake system 69. While a mechanical linkage is shown in FIG. 3, it should be understood that the invention is not limited thereto. In FIG. 2, actuation of valve 62 is via an adjustable mechanical link 70, one end of which is connected to the outer end 74 of control rod 72 (best seen in FIG. 3), with the other end of link 70 being pivotally connected to a brake pedal linkage 76. Linkage 76 in turn is pivotally connected to the vehicle body at 78 and also pivotally connected to a master cylinder 80 associated with wheel brakes 82.

Before going into the detailed description of inching valve 62, it should be noted that branching off from supply conduit 46 at 47, upstream from supply orifice 60, is a conduit 84 that has interposed therein a regulating or pressure relief valve 86, with conduits 84 and 84a carrying fluid under pressure to clutches 22 and 24 for cooling and lubricating functions well known in the art.

Reference is now made to FIG. 3 for a more detailed showing of the bypass type inching or regulating valve 62 of this invention. Regulating valve 62 includes an elongated valve block 90 having a longitudinally extending stepped through bore 88 that includes a central bore portion 92, an inner bore portion 94 and an outer bore portion 96. Communicating with central bore portion 92 is inlet port 98 which is connected with conduit 64 at 56, upstream from supply orifice 60, and drain port 100 which is connected to reservoir 40 via conduit 102. Communicating with outer bore portion 96 is an outlet port 104 which is connected with conduit 66 which in turn is connected at 58 to conduit 46 downstream from supply orifice 60 which in turn is located externally of valve 62.

Extending through central bore portion 92 is a cylindrical annular sleeve or spool member 108 having an annular groove 110 and apertures 112 therein. Sleeve member 108 is also provided with a further annular groove 114, having apertures 116 therein, with groove 114 and apertures 116 being communicable with drain port 100.

Close to its outer end 120, sleeve member 108 is provided with a retainer ring 122, with one side of ring 122 abutting the annular stepped surface formed at the intersection of central and outer bore portions 92 and 96. The outer end of outer bore portion 96 is closed off by a cap member 124 and spring means 126 is interposed between the inner circular end surface of cap member 124 and outer end 120 of sleeve member 108 so as to permanently bias retainer ring 122 and consequently sleeve member 108 into the position shown in FIG. 3.

Slidingly received within and extending partially through sleeve member bore 118 is the cylindrical annular portion 130 of regulating spool 128 which also includes a generally circular flange portion 132 and a locating rod portion 134. Rod portion 134 and cylindrical portion 130 depend from opposite sides 136 and 138 respectively of regulating spool flange portion 132. Regulating spool rod portion 134 and flange portion 132 are contained within valve block inner bore portion 94, with the annular inner end surface 142 of sleeve member 108 serving as an abutment surface for side 138 of regulating spool flange portion 132. Annular cylindrical portion 130 of regulating spool 128 is provided with an annular groove 144 which in turn has a plurality of radial apertures 146 that lead into regulating spool open-ended bore 148. As seen, in FIG. 3, in the rest position, regulating spool annular groove 144 is substantially aligned with apertures 112 in sleeve member 108. In addition, in the rest position, regulating spool outer end portion 152, terminating in control edge 154, closes off apertures 116 of sleeve member 108.

Threadably retained in a portion of valve block inner bore portion 94 is the inner end of generally tubular housing member 158 whose outer end portion is provided with an inwardly directed flange portion 160. The inner annular surface of flange portion 160 serves to slidably support and guide an outer end 74 of control rod 72 which extends longitudinally through bore 162 of housing member 158. The inner end of control rod 72 is provided with a blind bore 164 and an annular step portion 166 having an inner annular end surface 168 and an outer annular end surface 170. As best seen in FIG. 3, regulating spool flange portion side surface 136 serves as an abutment for surface 168 of control rod step portion 166. Interposed between housing member flange portion 160 and control rod step portion end surface 170 is a return spring means 172 which biases control rod 72 and consequently regulating spool flange side surface 138 against inner end surface 142 of fixed sleeve member 108. Interposed between the end of blind bore 164 of control rod 72 and regulating spool flange surface 136, and centered by regulating spool locating rod portion 134, is a regulating or balance spring means 174.

At this point it will be appreciated that locating spring means 126 has the sole function of biasing sleeve member 108 to the left and thus keeping it in a fixed position relative to valve block 90. The function of return spring means 172 is to bias control rod 72 to the right and consequently cause the abutment of regulating spool flange portion 132 against end surface 142 of sleeve 108 which in turn causes substantial alignment of regulating spool annular groove 144 with apertures 112 in sleeve member annular groove 110. As will be explained in more detail later, upon the axial leftward displacement of control rod 72, it is the function of regulating spring 174 to balance the fluid pressure acting on spool portion 130.

In operation, when vehicle 10 is standing with its engine idling, regulating valve 62 is in its inactive or FIG. 3 position whereby the pressurized fluid effectively bypasses supply orifice 60 and flows via conduits 46 and 64 into regulating valve 62. Upon entering inlet port 98, the fluid flows into sleeve member groove 110 and through its apertures 112 into regulating spool groove 114 and through its multiple apertures 146 into regulating spool bore 148. After flowing through bore 148, the pressurized fluid enters valve block bore portion 96 and exits therefrom via port 104 and conduit 66 back to conduit 46 downstream from supply line orifice 60 into directional control valve 44. As previously noted, if directional control valve 44 is in a position other than neutral, it selectively admits the pressurized fluid to either of the two directional control clutches 22 and 24.

Now, assuming that vehicle 10 is traveling forwardly in a normal manner, pressurized fluid continues to pass through regulating valve 62 in the previously described manner. Further, assuming that the operator desires to inch vehicle 10, he depresses the brake pedal with his foot thereby causing brake pedal linkage 76 to pivot at 78, thus initiating the application of the vehicle brakes and at the same time mechanically longitudinally or axially displacing regulating valve control rod 72 outwardly or to the left via mechanical linkage 70. This outward movement of control rod 72, which is opposed by the bias of return spring 172, also allows axial sliding leftward movement of regulating spool 128 due to the pressure of fluid acting against spool portion 130. As previously noted, since regulating spool annular groove 144 is substantially aligned with apertures 112 in sleeve member groove 110, only a small axial leftward movement, e.g., only a fraction of an inch, will cut off the communication between regulating spool annular groove 144 and sleeve member apertures 112, thereafter blocking this flow path into bore 148 and inching valve 62 and progressively opening port 100 to bores 96 and 148. The opening of port 100, via the leftward movement of spool outer end portion 152, will cause a substantial pressure drop within bore 148 and consequently in forward clutch 22. This initial pressure drop vs. control rod travel is graphically shown by lines 176, 175 respectively, in FIG. 4.

Once the flow of fluid through the inching valve, i.e., around supply orifice 60 is blocked, then the pressurized fluid is forced to flow to directional control valve 44 solely through supply orifice 60. The opening of port 100 of course permits not only the fluid in conduit 66 but also some of the fluid in conduit 46, downstream from supply orifice 60, to flow back into valve block bore portion 96 and out through port 100 back to the reservoir. During the inching operation, the forward or reverse clutch (depending on the position of directional control valve 44), of course, slips and the fluid pressure is decreased, in the manner previously described, in order to permit this slippage.

In the inching mode, the leftward movement of control rod 72 results in leftward movement of regulating spool 128 until sleeve member apertures 112 are covered, and thereafter port 100 is progressively uncovered, with the result that the fluid pressure in regulating valve 62 drops from the full clutch engaging pressure of about 185 PSI to a regulating pressure which, for example, may range from a maximum of about 30 PSI down to a minimum of about 5 PSI. Regulating spool 128 continues to uncover port 100 until the pressure in valve 62 drops to the point where the force exerted on valve portion 130 by the pressure fluid is in balance with the opposing force exerted by regulating spring 174. Thus, regulating spool control edge 154 and the edges of apertures 116 serve to regulate the fluid pressure being delivered to forward clutch 22. Regulating spool 128 will move slightly to the right to close off port 100 in order to compensate for a pressure drop caused by fluid leakage from the clutch, for example, and move slightly to the left to open communication with port 100 to compensate for a pressure rise.

Figure 4:
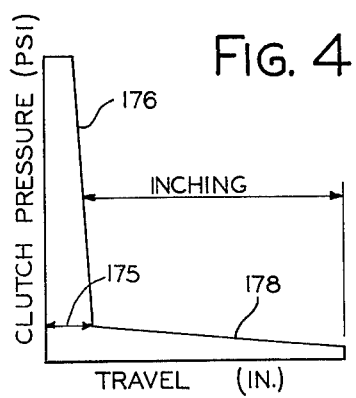
FIG. 4 shows a typical pressure vs. distance relationship for the inching valve of this invention.

As best seen in FIG. 4, while the initial pressure drop, as indicated by line 176, occurs during a very short travel distance 175 of control rod 72, the additional travel distance of control rod 72, as indicated by line 178, is quite long, thus permitting insensitive control by the vehicle operator and allowing smooth, inching performance.

It should be understood that the axial position of control rod 72 determines the force exerted by regulating spring 174 on regulating spool 128 which in turn determines the pressure maintained in the engaged clutch by regulating valve 62. Continued leftward movement of control rod 72, caused by increased pressure on the brake pedal, causes a continued decrease of the pressure maintained in the clutch. It should also be understood that in order for the regulating spring 174 to perform its function, step portion 166 of control rod 72 must be free from engagement with regulating spool flange portion 132 and the latter must also be free from engagement with sleeve member end face 142 so that regulating spool 128 is freely axially movable.

It should also be understood that a further depression of the brake pedal by the operator, which will cause continued leftward movement of control rod 72, causes an overtravel situation of control rod 72 relative to regulating spool 128. Thus, inching valve 62 permits overtraveling of its control rod after it has performed its declutching function in order to permit the full and timely application of the hydraulic brake system 82 without permitting undesirable free rolling of the vehicle between the inching and braking functions.

Assuming now that the operator has depressed the brake pedal (so that regulating spool 128 is maintaining a regulated pressure to clutch 22 intermediate the minimum and maximum regulated pressures), by allowing the brake pedal to return to its normal position, via the bias of return spring 172, the result is that the compression of regulating spring 174 progressively increases, and thus the regulated pressure being maintained by spool 128 also increases. Just before annular step portion 166 of control rod 72 comes into abutment with the adjacent surface 136 of spool flange portion 132, regulating spool 128 will be maintaining the maximum regulated pressure for inching operation, which pressure may, for example, be approximately 30 PSI. Further rightward movement of control rod 72 carries regulating spool 128 along with it. Since only a fraction of an inch of travel of regulating spool 128 to the right, from its regulating position, results in full pressure being delivered to the clutch, it is virtually impossible for the operator to position regulating spool 128 over this distance of travel to further regulate the fluid pressure being communicated to clutch 22, and so for all practical purposes the fluid pressure to the clutch quickly increases from the maximum regulated inching pressure of about 30 PSI to the full system pressure which may be on the order of 185 PSI.

From the preceding description it should be clear that, in the normal or non-inching mode of operation, the pressurized fluid required for clutch operation flows freely through inching valve 62 and effectively bypasses the supply orifice by flowing from conduit 46 through conduit 64 ahead of orifice 60, through the inching valve and back to conduit 46, via conduit 66, downstream from orifice 60. However, once the bypass through the inching valve is blocked, then the pressurized fluid is forced to flow solely through supply orifice 60. Orifice 60 which may, for example, have a 0.070 inch opening, acts as the supply conduit when the inching valve bypass is closed off and keeps one or the other of clutches 22 and 24 filled with pressurized fluid at all times, with fluid from the clutch undergoing inching flowing back to reservoir 40 via conduit 66, valve block bore portion 96, port 100 and conduit 102.

It should be understood that the pressure decrease needed during inching operation could of course be obtained by merely dumping the excess fluid to the reservoir, however a large supply of fluid is also needed to lubricate and remove the energy generated by the slipping clutch discs and it is the function of supply orifice 60 to lower the fluid flow without dumping all the fluid back to the reservoir. It is the function of conduit 84, emanating from supply conduit 46 and conduit 84a, to supply the surplus fluid, via valve 86, to the lubrication circuit for lubricating and cooling purposes.

The preceding description of the preferred embodiment of this invention is intended to be illustrative only and the scope of this invention should be determined from the following appended claims taken in conjunction with the prior art.

What is claimed is:

1. In a hydraulic control system for a vehicle, including brake means, comprising first hydraulic passage means connecting a source of pressure fluid to fluid actuated frictional engaging means, said source being provided with pressurizing means for providing pressurized fluid in an amount proportional to the speed of the engine of said vehicle, and a bypass type inching valve system connected and parallel with said first hydraulic passage means for selectively manually reducing the hydraulic pressure supplied into said frictional engaging means in proportion to the degree of actuation of said brake means, said bypass type inching valve system including a fluid flow constricting means disposed within said first passage means and an inching valve, said inching valve comprising:

a. an elongated valve body forming a first bore therein with a closed end, said body having inlet, outlet and drain ports in said body which communicate with said first bore;

b. first conduit means connecting said inlet port with said first hydraulic passage means upstream from said fluid flow constricting means;

c. second conduit means connecting said outlet port with said first hydraulic passage means downstream from said fluid flow restricting means;

d. sleeve spool means forming a second bore therein retained within said first bore and having a first annular groove with first radial apertures aligned with said inlet port, said sleeve spool means also having a second annular groove with second radial apertures aligned with said drain port;

e. regulating spool means, actuatable between a first and a second position, disposed within said first bore, said regulating spool means having a flange portion which, in the first position of said inching valve, abuts one annular end surface of said sleeve spool means, said regulating spool means also having a cylindrical annular portion, depending from one side of said flange portion and forming a third bore therein open on one end, slidably disposed within said second bore, with an outer end portion of said cylindrical annular portion, in said first position, closing off the communication between said second bore and said drain port, said cylindrical annular portion also having a third annular groove with third radial apertures therein substantially aligned with said first radial apertures in said first position;

f. first means for biasing said regulating spool means to said first position;

g. actuating means, operatively connected with said brake means for overcoming said first biasing means and permitting said regulating spool means to move to said second position; and h. second means for biasing, interposed between said regulating spool means and said actuating means, tending to balance the forces exerted on said regulating spool means by the pressure fluid, said actuating means also progressively decreasing the force of said second biasing means as the degree of actuation of said brake means is increased, whereby when said regulating spool means is in said first position, the pressure fluid can freely flow into, through and out of said inching valve and effectively bypass said fluid flow contricting means, however, in said second position, the fluid flow through said third annular groove is blocked and thereafter said drain port is progressively opened thereby regulating the force of the pressure fluid acting on said regulating spool means, and the pressure fluid is forced to flow solely through said fluid flow constricting means.

2. The control system of claim 1 wherein said frictional engaging means comprises fluid actuated forward and reverse clutch means, and said control system further includes a manual directional control valve disposed in said first hydraulic passage means downstream from said second conduit means for controlling the selection of a pair of fluid passages connecting said forward and reverse clutch means to said first hydraulic passage means.

3. The control system of claim 1 wherein said drain port is located intermediate said inlet and outlet ports.

4. The control system of claim 2 further including a second hydraulic passage means and a pressure relief valve therein connected to said first hydraulic passage means upstream from said first conduit means and said forward and reverse clutch means, for connecting said pressure fluid to said forward and reverse clutch means for lubrication and cooling purposes, said fluid flow constricting means, in the second position of said regulating spool means, functioning to lower the fluid flow through said first hydraulic passage means in order to increase the amount of fluid flow into said second hydraulic passage means.

5. A control apparatus for a vehicle having a transmission with fluid actuated clutch means and hydraulic brake means, comprising:

a. a source of fluid pressure including fluid pressurizing means therefor;

b. a first fluid conduit connecting said fluid pressure source with said clutch means;

c. fluid flow constricting means disposed in said first fluid conduit intermediate said fluid pressure source and said clutch means; and d. an inching valve means fluidically connected in parallel with said first fluid conduit by second and third conduits upstream and downstream, respectively, from said fluid flow constricting means, for regulating the fluid pressure supplied to said clutch means, said inching valve means being operatively connected with said brake means and responsive to the degree of actuation of said brake means and actuatable between a first and a second position, whereby in said first position, the pressure fluid can freely flow into, through and out of said inching valve toward said clutch means so as to effectively bypass said fluid flow constricting means; however, in said second position, the fluid flow through said second conduit is blocked off and the flow of pressure fluid toward said clutch means is forced to flow solely through said fluid flow constricting means, thereby keeping said clutch means filled with fluid at all times, said inching valve means including:

i. an elongated valve body forming a first bore therein with a closed end, said body having inlet, outlet and drain ports in said body which communicate with said first bore;

ii. sleeve spool means forming a second bore therein retained within said first bore and having a first annular groove with first radial apertures aligned with said inlet port, said sleeve spool means also having a second annular groove with second radial apertures aligned with said drain port;

iii. regulating spool means, actuatable between said first and second positions, disposed within said first bore, said regulating spool means having a flange portion which, in said first position, abuts one end surface of said sleeve spool means, said regulating spool means also having a cylindrical annular portion, depending from one side of said flange portion and forming a third bore therein open on one end, slidably disposed within said second bore, with an outer end portion of said cylindrical annular portion, in said first position, closing off the communication between said second bore and said drain port, said cylindrical annular portion also having a third annular groove with third radial apertures therein substantially aligned with said first radial apertures in said first position;

iv. first means for biasing said regulating spool means to said first position;

v. actuating means, operatively connected with said brake means, for overcoming said first biasing means and permitting said regulating spool means to move to said second position; and vi. second means for biasing, interposed between said regulating spool means and said actuating means, tending to balance the forces exerted on said regulating spool means by the pressure fluid, said actuating means also progressively decreasing the force of said second biasing means as the degree of actuation of said brake means is increased.

6. The control apparatus of claim 5 wherein said drain port is located intermediate said inlet and outlet ports.

7. The control apparatus of claim 5 wherein said actuating means includes a control rod that is directly mechanically interconnected with a brake pedal of said braking means and directly mechanically abuts one side of said regulating spool means flange portion in said first position and is resiliently connected with said flange portion in said second position.

8. The control apparatus of claim 7 wherein said second biasing means comprises a regulating spring interposed between said one side of said flange portion and the closed end of a bore in the adjacent end of said control rod.

9. The control apparatus of claim 5 further including a fourth fluid conduit and a pressure relief valve therein connected to said first fluid conduit upstream from said second conduit and said forward and reverse clutch means, for connecting said pressure fluid to said forward and reverse clutch means for lubrication and cooling purposes, said fluid flow constricting means, in said second position, functioning to lower the fluid flow through said first fluid conduit in order to increase the amount of fluid flow into said fourth fluid conduit.

10. The control apparatus of claim 1 wherein in said second position, after said fluid flow through said second conduit is blocked off, an outer end surface of said regulating spool outer end portion progressively opens up said drain port, thereby lowering the pressure of said pressure fluid within said inching valve means until said pressure drops to the point where the force exerted on said regulating spool means cylindrical annular portion by the pressure fluid is in balance with the opposing force exerted by said second biasing means.

* * * * *